(12) United States Patent
Kurihara et al.

(10) Patent No.: US 7,223,379 B2
(45) Date of Patent: May 29, 2007

(54) PROCESS FOR PRODUCING ALUMINUM OXIDE POWDER

(75) Inventors: Hitoshi Kurihara, Kiyosu (JP); Kouichirou Ootsu, Kiyosu (JP)

(73) Assignee: Fujimi Incorporated, Kiyosu-shi (JP)

( * ) Notice: Subject to any disclaimer, the term of this patent is extended or adjusted under 35 U.S.C. 154(b) by 0 days.

(21) Appl. No.: 11/249,267

(22) Filed: Oct. 14, 2005

(65) Prior Publication Data
US 2006/0086840 A1 Apr. 27, 2006

(30) Foreign Application Priority Data
Oct. 18, 2004 (JP) .............................. 2004-303283

(51) Int. Cl.
*B07B 13/04* (2006.01)
*B07C 5/12* (2006.01)
*C01F 7/02* (2006.01)

(52) U.S. Cl. .............................. 423/625; 423/DIG. 15; 209/509; 209/659

(58) Field of Classification Search ................ 423/625, 423/DIG. 15; 209/509, 659
See application file for complete search history.

(56) References Cited

U.S. PATENT DOCUMENTS

| 5,340,781 | A | * | 8/1994 | Oda et al. .................... 501/127 |
| 2005/0035230 | A1 | * | 2/2005 | Kanbara et al. ............... 241/23 |
| 2005/0182172 | A1 | * | 8/2005 | Kamimura et al. ......... 524/430 |

FOREIGN PATENT DOCUMENTS

| JP | 2001-180931 | 7/2001 |
| JP | 2003-12323 | 1/2003 |

* cited by examiner

*Primary Examiner*—Timothy C. Vanoy
(74) *Attorney, Agent, or Firm*—Oblon, Spivak, McClelland, Maier & Neustadt, P.C.

(57) ABSTRACT

To provide a process for producing an aluminum oxide powder, whereby the content of impurities is controlled by a physical means. A process for producing an aluminum oxide powder, which comprises pulverizing electrofused alumina by a batch system and classifying the obtained pulverized product to obtain an aluminum oxide powder different in the content of impurities. It is possible to obtain aluminum oxide of high purity by pulverization to a smaller average particle size and separating a powder having a larger average particle size by classification.

12 Claims, No Drawings

PROCESS FOR PRODUCING ALUMINUM OXIDE POWDER

The present invention relates to a process for producing an aluminum oxide powder. Particularly, it relates to a process whereby an aluminum oxide powder having controlled the content of impurities contained in aluminum oxide in the production of an alumina powder using electrofused alumina as raw material.

Aluminum oxide (alumina) is used in various applications as industrial material. Its applications extend not only as raw material for metallic aluminum but also for various materials such as thermal spray material, high alumina ceramic, refractory material, polishing material and bulking agent for plastics.

Recently, aluminum oxide has been used increasingly in the field of semiconductors, etc. In the field of semiconductors, the performance or quality of the products changes substantially by the presence of metal impurities, and aluminum oxide having higher purity is required. Further, aluminum oxide is frequently used as thermal spray material, and in such a case, if impurities are present in aluminum oxide, there may be a problem that such impurities will remain as colored spots in the formed layer. In order to comply with such requirements, a study has been made in the process for producing aluminum oxide to improve the purity by chemical means (Patent Documents 1 and 2). However, such methods are cumbersome since they employ chemical means, and a further improvement is considered to be required.

Patent Document 1: JP-A-2001-180931
Patent Document 2: JP-A-2003-012323

It is an object of the present invention to control the content of impurities contained in an aluminum oxide powder by a physical means in the production of an aluminum oxide powder employing electrofused alumina and to provide a process for producing a high purity aluminum oxide powder.

The present invention provides a process for producing an aluminum oxide powder, which comprises pulverizing electrofused alumina by a batch system and classifying the obtained pulverized product to obtain an aluminum oxide powder different in the content of impurities.

Further, the present invention provides another process for producing an aluminum oxide powder, which comprises pulverizing electrofused alumina by a batch system to a powder having an average particle size of $R_1$ and classifying the obtained pulverized product to obtain an aluminum oxide powder having an average particle size of R, wherein the above $R_1$ and R satisfy the following relation:

$$0.1 \leq R/R_1 \leq 3$$

Still further, the present invention provides an aluminum oxide powder having an average particle size of from 5 to 35 μm, obtained by such a process.

By the process of the present invention, it becomes possible to control the content of impurities in an aluminum oxide powder by a physical means, and it becomes possible to design and produce a functional component material to meet the application as a material for semiconductor components depending upon the content of impurities. Further, in the field for thermal spray material, it is possible to reduce colored points caused by impurities in aluminum oxide, which are likely to result when a coating layer is formed by thermal spraying.

Now, the present invention will be described in detail in reference to the preferred embodiments.

The raw material to be used for the process for producing an aluminum oxide powder according to the present invention, is electrofused alumina. This electrofused alumina may be in the form of ingots or in the form of a granular product or powder obtained by pulverizing such ingots. Electrofused alumina usually contains $SiO_2$, $Fe_2O_3$, $Na_2O$, etc. as impurities. In the present invention, it is preferred to employ electrofused alumina containing very small amounts of such impurities. Specifically, electrofused alumina having a purity (the aluminum oxide content) of usually from 90 to 99.5%, preferably from 99 to 99.5%, is used. If the purity of electrofused alumina to be used as the raw material is too low, the yield of the desired high purity aluminum oxide powder may sometimes be low. On the other hand, if the purity is too high, the effects of the present invention tends to hardly appear.

The process of the present invention comprises firstly pulverizing electrofused alumina and then classifying the obtained pulverized product.

By a study made by the present inventors, it has been found totally anew that when electrofused alumina is pulverized, the resulting particles differ in the content of impurities depending upon the particle sizes. Namely, with respect to individual particles after the pulverization, the smaller the particle size, the larger the content of impurities, and the larger the particle size, the smaller the content of impurities. Namely, it has been unexpectedly found that in a case where the particle sizes are selected by classifying powders having different average particle sizes obtained by pulverization, even if the average particle sizes obtained after the classification are the same, if the average particle sizes after the pulverization are different, the contents of impurities are different. Specifically, in a case where the average particle size after the pulverization is large, the content of impurities is small. Inversely, in a case where the average particle size after the pulverization is small, the content of impurities is large. It is surprising that such a distribution in the content of impurities will be created by a physical operation, and the content of impurities contained in the particles can be controlled by utilizing the phenomenon.

The reason as to why such a phenomenon occurs is not clearly understood. However, it is considered that impurities distributed in the raw material ingots or particles are not uniformly present and may have a concentration distribution to some extent, and a portion having a high impurity concentration is susceptible to breakage by a physical stress, and at the time of pulverization, the portion having a high impurity concentration will firstly be broken and pulverized, and particles after the pulverization will not internally have a portion having a high impurity concentration. On the other hand, fine particles formed by the pulverization will be surrounded by the portion having a high impurity content, or fine particles themselves will consist of the portion having a high impurity content.

Accordingly, the powder containing pulverized particles has a particle size distribution to some extent, but small particles formed by the pulverization tend to have a high impurity content, and the larger the particle size, the lower the impurity content. Namely, the distribution of the particle size and the distribution of the impurity content have a strong interrelation.

If such pulverized particles are classified depending upon the particle sizes, the obtained classified products will be those having impurity contents corresponding to the particle sizes. Accordingly, it will be possible to control the impurity content in the particles, i.e. the powder, obtained by the physical means.

Specifically, in a case where it is desired to obtain an aluminum oxide powder of high purity, electrofused alumina may be pulverized to a powder having an average particle size as small as possible, and one having an average particle size as large as possible may be obtained by classification. More specifically, in a case where it is desired to obtain an aluminum oxide powder of high purity, aluminum oxide as raw material may be pulverized to an average particle size of $R_1$, and an aluminum oxide powder having an average particle size of R may be obtained by classification, wherein $0.1 \leq R/R_1 \leq 3$ is preferred, and $0.4 \leq R/R_1 \leq 3$ is more preferred. If the average particle size $R_1$ of the powder obtained by pulverization is too small relative to the average particle size R of the desired powder, such will cause a deterioration in the yield, and if the average particle size $R_1$ of the powder obtainable by the pulverization is close to the desired average particle size R, it tends to be difficult to obtain the effects by the present invention.

According to such a process of the present invention, the impurity content can be reduced to a level of at most 50%, preferably at most 20%, more preferably at most 10%, relative to aluminum oxide as raw material. According to the process of the present invention, it is thereby possible to produce an aluminum oxide powder having a purity of at least 99.90%, preferably at least 99.95%, by using, as raw material, electrofused alumina having a purity of e.g. 99.8%.

In a case where it is intended to obtain an aluminum oxide powder of high purity, aluminum oxide remaining after removal of the desired aluminum oxide powder by classification, may be used for an application where high purity is not required, or may, for example, be melted to regenerate ingots, which may be used as raw material for the process of the present invention.

In the process for producing an aluminum oxide powder of the present invention, the pulverization and classification may be repeated at least twice. Namely, ingots or powder of electrofused alumina as raw material may be pulverized and classified, and then, the obtained classified product may further be pulverized and classified.

In the process of the present invention, the pulverization of electrofused alumina may be carried out by an optional method so long as it is of a batch system, employing e.g. a ball mill, a jet mill or a roller mill. It is particularly preferred to carry out the pulverization by a ball mill from the viewpoint of costs.

Further, the obtained pulverized product will then be classified. The classification may be carried out by an optional method of e.g. dry system or wet system. It is particularly preferred to carry out the classification by a wet system from the viewpoint of the precision in classification.

The size of the aluminum oxide powder to be produced by the process for producing an aluminum oxide powder of the present invention, may be optionally selected depending upon the desired application. However, it is usually employed for producing a powder having an average particle size of 0.1 to 100 μm, preferably from 5 to 35 μm, as measured by a laser diffraction scattering method.

The aluminum oxide powder produced by the present invention may be employed not only as a material for semiconductor components but also for various applications where a high purity material is required, such as a polishing or abrasive material, a thermal spray powder or an insulating material. By the process of the present invention, it is particularly possible to provide an aluminum oxide powder suitable for an application where an aluminum oxide powder of high purity is required.

TEST EXAMPLE 1

Raw material A (average particle size: 3 mm, purity: 99.81%) of electrofused alumina was pulverized by a ball mill to obtain a pulverized product A0 having an average particle size of 30 μm. This pulverized product A was classified by wet system classification to obtain classified products A1 to A5 having average particle sizes of 1, 2, 4, 13 and 30 μm, respectively.

The components of the pulverized product and the respective classified products were measured by an atomic absorption photometer AA-6800 manufactured by Shimadzu Corporation. The obtained results were as shown in Table 1. The measurements of the average particle sizes in the respective Examples were all carried out by Microtrac FRA manufactured by Nikkiso K.K.

TABLE 1

| No. | Product | Average particle size D50% | Components | | | | Notes |
| --- | --- | --- | --- | --- | --- | --- | --- |
| | | | $Al_2O_3$ | $SiO_2$ | $Fe_2O_3$ | $Na_2O$ | |
| Comp. Ex. 1 | Pulverized product A0 | 30 μm | 99.81% | 0.12% | 0.02% | 0.05% | Product obtained by pulverizing raw material A |
| Ex. 1 | Classified product A1 | 1 μm | 99.43% | 0.51% | 0.02% | 0.04% | Product obtained by classifying pulverized product A |
| Ex. 2 | Classified product A2 | 2 μm | 99.84% | 0.11% | 0.01% | 0.04% | Product obtained by classifying pulverized product A |
| Ex. 3 | Classified product A3 | 4 μm | 99.90% | 0.06% | 0.01% | 0.03% | Product obtained by classifying pulverized product A |
| Ex. 4 | Classified product A4 | 13 μm | 99.95% | 0.02% | 0.01% | 0.02% | Product obtained by classifying pulverized product A |
| Ex. 5 | Classified product A5 | 30 μm | 99.96% | 0.01% | 0.01% | 0.01% | Product obtained by classifying pulverized product A |

TEST EXAMPLE 2

Using raw material B (average particle size: 200 μm, purity: 99.67%) of electrofused alumina, pulverized product B0 having an average particle size of 30 μm was obtained in the same manner as in Test Example 1. Further, this pulverized product was classified to obtain classified products B1 to B5 having average particle sizes of 1, 2, 4, 13 and 30 μm, respectively. The components of the obtained pulverized product and the respective classified products were as shown in Table 2.

TABLE 2

| No. | Product | Average particle size D50% | Components Al$_2$O$_3$ | SiO$_2$ | Fe$_2$O$_3$ | Na$_2$O | Notes |
|---|---|---|---|---|---|---|---|
| Comp. Ex. 2 | Pulverized product B0 | 30 μm | 99.67% | 0.15% | 0.03% | 0.15% | Product obtained by pulverizing raw material B |
| Ex. 6 | Classified product B1 | 1 μm | 98.96% | 0.82% | 0.05% | 0.17% | Product obtained by classifying pulverized product B |
| Ex. 7 | Classified product B2 | 2 μm | 99.14% | 0.70% | 0.04% | 0.12% | Product obtained by classifying pulverized product B |
| Ex. 8 | Classified product B3 | 4 μm | 99.43% | 0.43% | 0.04% | 0.10% | Product obtained by classifying pulverized product B |
| Ex. 9 | Classified product B4 | 13 μm | 99.65% | 0.24% | 0.02% | 0.09% | Product obtained by classifying pulverized product B |
| Ex. 10 | Classified product B5 | 30 μm | 99.83% | 0.09% | 0.01% | 0.07% | Product obtained by classifying pulverized product B |

From the results in Tables 1 and 2, it is evident that when aluminum oxide particles are pulverized and then classified, the larger the average particle size of the classified product, the larger the content of aluminum oxide, the smaller the impurity content. Namely, it is evident that when an aluminum oxide powder having the same average particle size is to be obtained from the same raw material powder, by pulverizing the raw material powder into small particles, followed by classification, it is possible to obtain particles with less impurities or particles having a higher purity. Further, from the comparison between Comparative Example 1 and Example 5, or from the comparison between Comparative Example 2 and Example 10, it is evident that when the powder obtained by merely pulverizing aluminum oxide is compared with a powder obtained by pulverizing aluminum oxide, followed by classification, the impurity content in the aluminum oxide powder obtained by pulverizing, followed by classification, is less even when the respective average particle sizes are the same.

TEST EXAMPLE 3

Using raw material C (average particle size: 200 μm, purity: 99.67%) of electrofused alumina, pulverized products C1 and C2 having average particle sizes of 30 μm and 60 μm, respectively, were obtained in the same manner as in Test Example 1. Further, these pulverized products C were respectively classified to obtain classified products C3 and C4 having an average particle size of 30 μm. The components of the obtained pulverized products and classified products were as shown in Table 3.

From the results in Table 3, it is evident that in a case where an aluminum oxide powder having a specific average particle size is obtained by classification after pulverization, it is possible to obtain a powder having a smaller impurity content as the average particle size after pulverization is smaller.

The entire disclosure of Japanese Patent Application No. 2004-303283 filed on Oct. 18, 2004 including specification, claims, and summary is incorporated herein by reference in its entirety.

What is claimed is:

1. A process for producing an aluminum oxide powder, which comprises pulverizing electrofused alumina by a batch system and classifying the obtained pulverized product to obtain an aluminum oxide powder different in the content of impurities.

2. The process according to claim 1, wherein the content of impurities in the aluminum oxide powder after the classification is not higher than 50% of the content of impurities in the electrofused alumina as raw material.

3. The process according to claim 2, wherein the aluminum oxide powder has an average particle size of from 5 to 35 μm.

4. The process according to claim 3, wherein the aluminum oxide powder has a purity of at least 99.50%.

5. The process according to claim 2, wherein said content of impurities is at most 20% of the content of impurities in the electrofused alumina as raw material.

TABLE 3

| No. | Product | Average particle size D50% | Components Al$_2$O$_3$ | SiO$_2$ | Fe$_2$O$_3$ | Na$_2$O | Notes |
|---|---|---|---|---|---|---|---|
| Comp. Ex. 3 | Pulverized product C1 | 30 μm | 99.65% | 0.15% | 0.03% | 0.17% | Product obtained by pulverizing raw material C |
| Comp Ex. 4 | Pulverized product C2 | 60 μm | 99.67% | 0.14% | 0.03% | 0.16% | Product obtained by pulverizing raw material C |
| Ex. 11 | Classified product C3 | 30 μm | 99.83% | 0.09% | 0.01% | 0.07% | Product obtained by classifying pulverized product C |
| Ex. 12 | Classified product C4 | 30 μm | 99.80% | 0.10% | 0.01% | 0.09% | Product obtained by classifying pulverized product C |

6. The process according to claim 2, wherein said content of impurities is at most 10% of the content of impurities in the electrofused alumina as raw material.

7. The process according to claim 1, wherein the aluminum oxide powder has an average particle size of from 5 to 35 μm.

8. The process according to claim 7, wherein the aluminum oxide powder has a purity of at least 99.50%.

9. A process for producing an aluminum oxide powder, which comprises pulverizing electrofused alumina by a batch system to a powder having an average particle size of $R_1$ and classifying the obtained pulverized product to obtain an aluminum oxide powder having an average particle size of R, wherein the above $R_1$ and R satisfy the following relation:

$$0.1 \leq R/R_1 \leq 3.$$

10. The process according to claim 9, wherein the aluminum oxide powder has an average particle size of from 5 to 35 μm.

11. The process according to claim 10, wherein the aluminum oxide powder has a purity of at least 99.50%.

12. The process according to claim 9, wherein $$0.4 \leq R/R_1 \leq 3.$$

* * * * *